United States Patent
Wang et al.

(10) Patent No.: US 11,099,690 B2
(45) Date of Patent: Aug. 24, 2021

(54) CAPACITANCE COMPENSATION MODULE AND METHOD, SELF-CAPACITIVE TOUCH DISPLAY PANEL AND DISPLAY DEVICE

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Xueying Wang, Beijing (CN); Jigang Sun, Beijing (CN); Wanhua Yang, Beijing (CN); Yue Lang, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 554 days.

(21) Appl. No.: 16/079,132

(22) PCT Filed: Feb. 1, 2018

(86) PCT No.: PCT/CN2018/074920
§ 371 (c)(1),
(2) Date: Aug. 23, 2018

(87) PCT Pub. No.: WO2019/015301
PCT Pub. Date: Jan. 24, 2019

(65) Prior Publication Data
US 2021/0191538 A1      Jun. 24, 2021

(30) Foreign Application Priority Data
Jul. 17, 2017   (CN) .......................... 201710580620.0

(51) Int. Cl.
*G06F 3/044*    (2006.01)

(52) U.S. Cl.
CPC .................................. *G06F 3/044* (2013.01)

(58) Field of Classification Search
CPC ...... G06F 3/044; G06F 3/0412; G06F 3/0418; G06F 2203/04107
See application file for complete search history.

(56) References Cited

U.S. PATENT DOCUMENTS

2009/0231286 A1      9/2009   Kuo

FOREIGN PATENT DOCUMENTS

| CN | 101546232 A | 9/2009 |
|---|---|---|
| CN | 102193577 A | 9/2011 |

(Continued)

OTHER PUBLICATIONS

International Search Report and Written Opinion, English Translation.

(Continued)

*Primary Examiner* — Michael Pervan
(74) *Attorney, Agent, or Firm* — Brooks Kushman P.C.

(57) ABSTRACT

The present disclosure provides a capacitance compensation module, a capacitance compensation method, a self-capacitive touch display panel and a self-capacitive touch display device. The capacitance compensation module includes: a detection circuitry configured to detect an initial capacitance of a capacitor formed between each of the plurality of touch electrodes and the ground when the touch electrode is not being touched; a determination circuitry connected to the detection circuitry, and configured to determine whether the touch electrode is an abnormal touch electrode in accordance with the initial capacitance and output a compensation control signal when the touch electrode is the abnormal touch electrode; and a compensation circuitry connected to the determination circuitry and configured to, upon the receipt of the compensation control signal, apply a compen- (Continued)

sation voltage to the abnormal touch electrode, so as to enable the initial capacitance of the capacitor formed between the abnormal touch electrode and the ground to be within a standard capacitance range. According to at least one of embodiments of the present disclosure, it is able to at least partially prevent the occurrence of a capacitance warpage at a periphery of the self-capacitive touch display panel.

20 Claims, 3 Drawing Sheets

(56) References Cited

FOREIGN PATENT DOCUMENTS

| | | |
|---|---|---|
| CN | 107219961 A | 9/2017 |
| JP | 2016018289 A | 2/2016 |
| TW | 200939083 A | 9/2009 |

OTHER PUBLICATIONS

C101546232A, English Abstract and Translation.
CN102193577A, English Abstract and Translation.
CN107219961A, English Abstract and Translation.
JP2016018289A, English Abstract and Translation.
TW200939083A, English Abstract and Translation.
International Search Report and Written Opinion for Application No. PCT/CN2018/074920, dated May 4, 2018, 10 Pages.

US 11,099,690 B2

CAPACITANCE COMPENSATION MODULE AND METHOD, SELF-CAPACITIVE TOUCH DISPLAY PANEL AND DISPLAY DEVICE

CROSS-REFERENCE TO RELATED APPLICATION APPLICATIONS

This application is the U.S. national phase of PCT Application No. PCT/CN2018/074920 filed on Feb. 1, 2018, which claims priority to Chinese Patent Application No. 201710580620.0 filed on Jul. 17, 2017, which are incorporated herein by reference in their entireties.

TECHNICAL FIELD

The present disclosure relates to the field of touch display technology, in particular to a capacitance compensation module, a capacitance compensation method, a self-capacitive touch display panel, and a self-capacitive touch display device.

BACKGROUND

Conventional Full in Cell (FIC) touch display panel is an in-cell self-capacitive touch display panel. For the FIC touch display panel, touch lines are arranged at a single layer, and a multi-point touch operation is achieved on the basis of a self-capacitance principle. In order to increase the resistance to Electro-Static Discharge (ESD), a ground line is arranged at a periphery of the FIC touch display panel. At this time, a capacitance warpage may occur at the periphery of the FIC touch display panel, i.e., an initial capacitance of a capacitor formed between the ground and a touch electrode at the periphery of the FIC touch display panel may increase when the touch electrode is not being touched.

SUMMARY

In one aspect, the present disclosure provides in some embodiments a capacitance compensation module for use in a self-capacitive touch display panel including a plurality of touch electrodes arranged on a display substrate. The capacitance compensation module includes: a detection circuitry configured to detect an initial capacitance of a capacitor formed between each of the plurality of touch electrodes and the ground when the touch electrode is not being touched; a determination circuitry connected to the detection circuitry, and configured to determine whether the touch electrode is an abnormal touch electrode in accordance with the initial capacitance and output a compensation control signal when the touch electrode is the abnormal touch electrode; and a compensation circuitry connected to the determination circuitry and configured to, upon the receipt of the compensation control signal, apply a compensation voltage to the abnormal touch electrode, so as to enable the initial capacitance of the capacitor formed between the abnormal touch electrode and the ground to be within a standard capacitance range.

In a possible embodiment of the present disclosure, the detection circuitry is further configured to treat the initial capacitance through a predetermined algorithm, perform analog-to-digital conversion on the treated capacitance so as to acquire raw data, and convert the raw data into an original voltage applied to the touch electrode when the touch electrode is not being touched. The determination circuitry is further configured to output the compensation control signal when the original voltage applied to the touch electrode is not within a standard voltage range, and mark the touch electrode as the abnormal touch electrode.

In a possible embodiment of the present disclosure, the standard voltage range is smaller than or equal to a first voltage threshold, or the standard voltage range is smaller than or equal to the first voltage threshold and greater than or equal to a second voltage threshold that is smaller than the first voltage threshold.

In a possible embodiment of the present disclosure, when the standard voltage range is smaller than or equal to the first voltage threshold, the compensation circuitry includes a compensation control signal input end configured to receive the compensation control signal. The detection circuitry includes an original voltage output end configured to output the original voltage. The determination circuitry includes a voltage comparator, a positive phase input end of which is connected to the original voltage output end of the detection circuitry, a negative phase input end of which is connected to a first voltage threshold input end, and an output end of which is connected to the compensation control signal input end.

In a possible embodiment of the present disclosure, when the standard voltage range is smaller than or equal to the first voltage threshold and greater than or equal to the second voltage threshold that is smaller than the first voltage threshold, the compensation circuitry includes a compensation control signal input end configured to receive the compensation control signal. The detection circuitry includes an original voltage output end configured to output the original voltage. The determination circuitry includes a first voltage comparator, a second voltage comparator, and an OR gate. A positive phase input end of the first voltage comparator is connected to the original voltage output end of the detection circuitry, a negative phase input end of the first voltage comparator is connected to a first voltage threshold input end, and an output end of the first voltage comparator is connected to a first input end of the OR gate. A positive phase input end of the second voltage comparator is connected to a second voltage threshold input end, a negative phase input end of the second voltage comparator is connected to the original voltage output end of the detection circuitry, and an output end of the second voltage comparator is connected to a second input end of the OR gate. An output end of the OR gate is connected to the compensation control signal input end.

In a possible embodiment of the present disclosure, the compensation circuitry further includes: a compensation voltage output end configured to output the compensation voltage; a control switch transistor, a gate electrode of which is connected to the compensation control signal input end, and a first electrode of which is connected to a high power source voltage input end; a first divider resistor unit, a first end of which is connected to a second electrode of the control switch transistor, and a second end of which is connected to the compensation voltage output end; and a second divider resistor unit, a first end of which is connected to the compensation voltage output end, and a second end of which is connected to a low power source voltage input end.

In another aspect, the present disclosure provides in some embodiments a capacitance compensation method for use in the above-mentioned capacitance compensation module, including: detecting, by the detection circuitry, an initial capacitance of a capacitor formed between each of a plurality of touch electrodes included in a self-capacitive touch display panel and the ground when the touch electrode is not being touched; outputting a compensation control signal when the determination circuitry determines that the touch electrode is an abnormal touch electrode in accordance with the initial capacitance; and applying, by the compensation circuitry, a compensation voltage to the abnormal touch electrode upon the receipt of the compensation control signal, so as to enable the initial capacitance of the capacitor formed between the abnormal touch electrode and the ground to be within a standard capacitance range.

In a possible embodiment of the present disclosure, subsequent to detecting, by the detection circuitry, the initial capacitance of the capacitor formed between each of the plurality of touch electrodes included in the self-capacitive touch display panel and the ground when the touch electrode is not being touched, the capacitance compensation method further includes treating, by the detection circuitry, the initial capacitance through a predetermined algorithm, performing analog-to-digital conversion on the treated initial capacitance so as to acquire raw data, and converting the raw data into an original voltage applied to the touch electrode when the touch electrode is not being touched. The outputting the compensation control signal when the determination circuitry determines that the touch electrode is the abnormal touch electrode in accordance with the initial capacitance includes outputting the compensation control signal when the determination circuitry determines that the original voltage applied to the touch electrode is not within a standard voltage range, and marking the touch electrode as the abnormal touch electrode.

In a possible embodiment of the present disclosure, the standard voltage range is smaller than or equal to a first voltage threshold, or the standard voltage range is smaller than or equal to the first voltage threshold and greater than or equal to a second voltage threshold that is smaller than the first voltage threshold.

In yet another aspect, the present disclosure provides in some embodiments a self-capacitive touch display panel including the above-mentioned capacitance compensation module.

In still yet another aspect, the present disclosure provides in some embodiments a self-capacitive touch display device including the above-mentioned self-capacitive touch display panel.

In a possible embodiment of the present disclosure, the self-capacitive touch display device further includes a driving integrated circuit (IC). The compensation circuitry of the capacitance compensation module included in the self-capacitive touch display panel is configured to, upon the receipt of the compensation control signal, apply a compensation voltage to an abnormal touch electrode via the driving IC, so as to enable an initial capacitance of a capacitor formed between the abnormal touch electrode and the ground is within a standard capacitance range.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
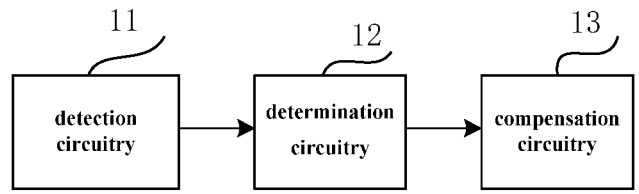
FIG. 1 is a schematic view showing a capacitance compensation module according to one embodiment of the present disclosure.

The present disclosure provides in some embodiments a capacitance compensation module for use in a self-capacitive touch display panel. The self-capacitive touch display panel includes a plurality of touch electrodes arranged on a display substrate. As shown in FIG. 1, the capacitance compensation module includes: a detection circuitry 11 configured to detect an initial capacitance of a capacitor formed between each of the plurality of touch electrodes and the ground when the touch electrode is not being touched; a determination circuitry 12 connected to the detection circuitry 11, and configured to determine whether the touch electrode is an abnormal touch electrode in accordance with the initial capacitance and output a compensation control signal when the touch electrode is the abnormal touch electrode; and a compensation circuitry 13 connected to the determination circuitry 12 and configured to, upon the receipt of the compensation control signal, apply a compensation voltage to the abnormal touch electrode, so as to enable the initial capacitance of the capacitor formed between the abnormal touch electrode and the ground to be within a standard capacitance range.

According to the capacitance compensation module in the embodiments of the present disclosure, the detection circuitry 11 detects the initial capacitance. The determination circuitry 12 determines whether the touch electrode is the abnormal touch electrode in accordance with the initial capacitance, and outputs the compensation control signal when the touch electrode is the abnormal touch electrode. Upon the receipt of the compensation control signal, the compensation circuitry 13 applies the compensation voltage to the abnormal touch electrode, so as to enable the initial capacitance of the abnormal touch electrode to be within the standard capacitance range. As a result, it is able to provide a uniform full-screen capacitance, improve the yield of a touch member of the self-capacitive touch display panel, and prevent the occurrence of a capacitance warpage at a periphery of the self-capacitive touch display panel. In addition, it is able to improve the yield of the touch display panel, and reduce the manufacture cost.

The capacitance compensation module in the embodiments of the present disclosure may be applied to an FIC touch display panel which is an in-cell self-capacitive touch display panel. For the FIC touch display panel, touch lines are arranged at a single layer, and a multi-point touch operation is achieved on the basis of a self-capacitance principle. In order to increase the resistance to ESD, a ground line is arranged at a periphery of the FIC touch display panel. At this time, a capacitance warpage may occur at the periphery of the FIC touch display panel, i.e., an initial capacitance of a capacitor formed between the ground and a touch electrode at the periphery of the FIC touch display panel may increase when the touch electrode is not being touched. Through the capacitance compensation module in the embodiments of the present disclosure, it is able to effectively solve the above-mentioned problem.

In the embodiments of the present disclosure, the detection circuitry 11 collects the initial capacitance, the determination circuitry 12 determines the abnormal touch electrode, and the compensation circuitry 13 compensates for the voltage applied to the abnormal touch electrode, so as to prevent the occurrence of any fault due to the capacitance warpage. In actual use, capacitance detection software may be provided in the detection circuitry 11.

In a possible embodiment of the present disclosure, the detection circuitry 11 is further configured to treat the initial capacitance through a predetermined algorithm, perform analog-to-digital conversion on the treated capacitance so as to acquire raw data, and convert the raw data into an original voltage Ui applied to the touch electrode when the touch electrode is not being touched.

The determination circuitry 12 is further configured to output the compensation control signal when the original voltage Ui applied to the touch electrode is not within a standard voltage range, and mark the touch electrode as the abnormal touch electrode.

During the implementation, with respect to a Not-Good (NG) display panel where there is an edge warpage for the raw data, the detection circuitry 11 may treat the initial capacitance through the predetermined algorithm, and perform the analog-to-digital conversion on the treated initial capacitance to acquire the raw data (which is calculated during the operation of the conventional touch display panel), and then convert the raw data into the original voltage Ui applied to the touch electrode. Then, the determination circuitry 12 may determine whether the touch electrode is the abnormal touch electrode in accordance with the original voltage Ui.

The raw voltage is acquired after treating the initial capacitance using touch testing and debugging software provided by IC manufacturers with respect to a specific FIC touch display product, and then performing the analog-to-digital conversion.

When the detection circuitry 11 detects the initial capacitance of the capacitor formed between the touch electrode and the ground, the original voltage Ui may be generated across two ends of the capacitor due to a charging operation. A relationship between the original voltage Ui and the initial capacitance C may be represented as C=Q/Ui, where Q represents a quantity of charges stored in the capacitor. In other words, the raw data may be converted into the original voltage Ui.

In actual use, a standard data voltage range for the NG display panel may be ($\alpha$, $\beta$), and the standard voltage range for the NG display panel may be (U$\alpha$, U$\beta$), where $\beta$ represents a first data voltage threshold, $\alpha$ represents a second data voltage threshold, U$\beta$ represents a first voltage threshold, and U$\alpha$ represents a second voltage threshold. When for a certain touch electrode, U$\alpha \le$ Ui $\le$ U$\beta$, i.e., the data voltage corresponding to the touch electrode is within the standard data voltage range, it may be determined that the touch electrode is a normal touch electrode. When Ui<U$\alpha$ or U$\beta$<Ui, i.e., the data voltage corresponding to the touch electrode is not within the standard data voltage range, it may be determined that the touch electrode is the abnormal touch electrode. Due to the warpage (i.e., a large data voltage at the edge), in actual use, the abnormal touch electrode may be determined merely taking whether Ui>U$\beta$ into consideration.

To be specific, the standard voltage range may be smaller than or equal to the first voltage threshold U$\beta$, or the standard voltage range may be smaller than or equal to the first voltage threshold U$\beta$ and greater than or equal to the second voltage threshold U$\alpha$ that is smaller than the first voltage threshold U$\beta$.

Figure 2:
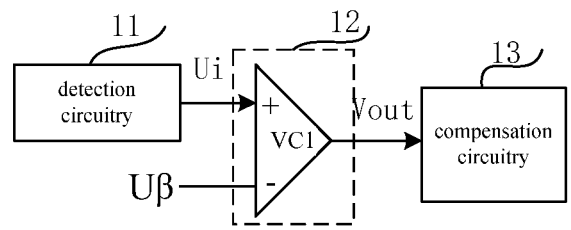
FIG. 2 is a circuit diagram of the capacitance compensation module according to one embodiment of the present disclosure.

In a possible embodiment of the present disclosure, when the standard voltage range is smaller than or equal to the first voltage threshold U$\beta$, as shown in FIG. 2, the compensation circuitry 13 includes a compensation control signal input end configured to receive the compensation control signal Vout (in FIG. 2, the compensation control signal Vout is a voltage signal). The detection circuitry 11 includes an original voltage output end configured to output the original voltage Ui.

The determination circuitry 12 includes a voltage comparator VC1, a positive phase input end of which is connected to the original voltage output end of the detection circuitry 11, a negative phase input end of which is connected to a first voltage threshold input end for inputting the first voltage threshold U$\beta$, and an output end of which is connected to the compensation control signal input end.

During the operation of the capacitance compensation module in FIG. 2, when Ui is smaller than or equal to the first voltage threshold U$\beta$, the voltage comparator VC1 may output a low voltage signal (corresponding to a digital signal "0"), i.e., the compensation control signal Vout is a low voltage signal. In addition, when Ui is greater than the first voltage threshold U$\beta$, the voltage comparator VC1 may output a high voltage signal (corresponding to a digital signal "1"), i.e., the compensation control signal Vout is a high voltage signal.

Figure 3:
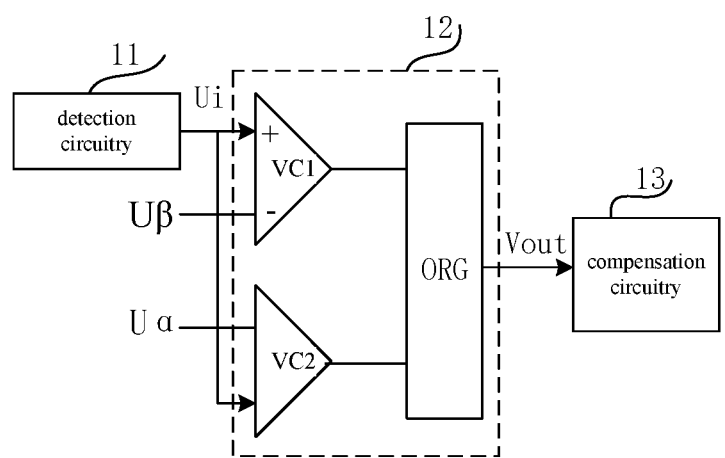
FIG. 3 is another circuit diagram of the capacitance compensation module according to one embodiment of the present disclosure.

In another possible embodiment of the present disclosure, when the standard voltage range is smaller than or equal to the first voltage threshold U$\beta$ and greater than or equal to the second voltage threshold U$\alpha$ that is smaller than the first voltage threshold U$\beta$, as shown in FIG. 3, the compensation circuitry 13 includes a compensation control signal input end configured to receive the compensation control signal Vout. The detection circuitry 11 includes an original voltage output end configured to output the original voltage Ui.

The determination circuitry 12 includes a first voltage comparator VC1, a second voltage comparator VC2, and an OR gate ORG. A positive phase input end of the first voltage comparator VC1 is connected to the original voltage output end of the detection circuitry 11, a negative phase input end of the first voltage comparator VC1 is connected to a first voltage threshold input end for inputting the first voltage threshold U$\beta$, and an output end of the first voltage comparator VC1 is connected to a first input end of the OR gate ORG. A positive phase input end of the second voltage comparator VC2 is connected to a second voltage threshold input end for inputting the second voltage threshold Uα, a negative phase input end of the second voltage comparator VC2 is connected to the original voltage output end of the detection circuitry 11, and an output end of the second voltage comparator VC2 is connected to a second input end of the OR gate ORG. An output end of the OR gate ORG is connected to the compensation control signal input end of the compensation circuitry 13 for receiving the compensation control signal Vout.

During the operation of the capacitance compensation module in FIG. 3, when Ui is smaller than or equal to the first voltage threshold Uβ, the voltage comparator VC1 may output the low voltage signal, the first input end of the OR gate ORG may receive the low voltage signal. In addition, when Ui is greater than the first voltage threshold Uβ, the voltage comparator VC1 may output the high voltage signal, and the first input end of the OR gate ORG may receive the high voltage signal.

When Ui is smaller than or equal to the second voltage threshold Uα, the voltage comparator VC1 may output the high voltage signal, and the second input end of the OR gate ORG may receive the high voltage signal. In addition, when Ui is greater than the second voltage threshold Uα, the voltage comparator VC1 may output the low voltage signal, and the second input end of the OR gate ORG may receive the low voltage signal.

When Ui is within the standard voltage range, i.e., when Ui is smaller than or equal to Uβ and greater than or equal to Uα, the first input end of the OR gate ORG may receive the low voltage signal (corresponding to the digital signal "0"), and the second input end of the OR gate ORG may also receive the low voltage signal (corresponding to the digital signal "0"). At this time, the OR gate ORG may output the low voltage signal (corresponding to the digital signal "0").

When Ui is not within the standard voltage range, there are the following two circumstances.

In a first circumstance, when Ui is greater than UP, Ui may be certainly greater than Ua. The first input end of the OR gate ORG may receive the high voltage signal (corresponding to the digital signal "1"), the second input end of the OR gate ORG may receive the low voltage signal (corresponding to the digital signal "0"), so the OR gate ORG may output the high voltage signal (corresponding to the digital signal "1"). At this time, the compensation control signal Vout is the high voltage signal.

In a second circumstance, when Ui is smaller than Ua, Ui may be certainly smaller than UP. The first input end of the OR gate ORG may receive the low voltage signal (corresponding to the digital signal "0"), the second input end of the OR gate ORG may receive the high voltage signal (corresponding to the digital signal "1"), so the OR gate ORG may output the high voltage signal (corresponding to the digital signal "1"). At this time, the compensation control signal Vout is the high voltage signal.

To be specific, the compensation circuitry may further include: a compensation voltage output end configured to output the compensation voltage; a control switch transistor, a gate electrode of which is connected to the compensation control signal input end, and a first electrode of which is connected to a high power source voltage input end; a first divider resistor unit, a first end of which is connected to a second electrode of the control switch transistor, and a second end of which is connected to the compensation voltage output end; and a second divider resistor unit, a first end of which is connected to the compensation voltage output end, and a second end of which is connected to a low power source voltage input end.

Figure 4:
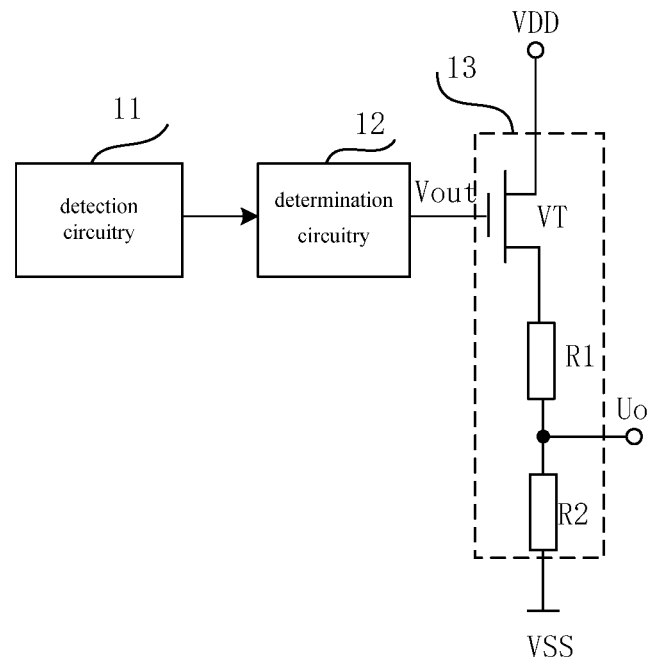
FIG. 4 is yet another circuit diagram of the capacitance compensation module according to one embodiment of the present disclosure.

During the implementation, as shown in FIG. 4, the compensation circuit 13 may include: a compensation control signal input end for receiving the compensation control signal Vout; a compensation voltage output end configured to output the compensation voltage Uo; a control switch transistor VT, a gate electrode of which is connected to the compensation control signal input end (for receiving the compensation control signal Vout), and a drain electrode of which is connected to a high power source voltage input end for inputting a high power source voltage VDD; a first divider resistor R1, a first end of which is connected to a source electrode of the control switch transistor VT, and a second end of which is connected to the compensation voltage output end; and a second divider resistor R2, a first end of which is connected to the compensation voltage output end, and a second end of which is connected to a low power source voltage input end for inputting a low power source voltage VSS.

In FIG. 4, VT is an n-type transistor. However, in actual use, VT may also be a p-type transistor. Here, a type of the transistor will not be particularly defined.

During the operation of the capacitance compensation module in FIG. 4, when a high voltage signal is applied to the gate electrode of VT, i.e., when Ui is not within the standard voltage range, VT may be turned on. At this time, Uo is equal to $(VDD-VSS)*RZ2/(RZ1+RZ2)$, where RZ1 represents a resistance of the first divider resistor R1, and RZ2 represents a resistance of the second divider resistor R2. In other words, the compensation for the capacitance is completed through the compensation for the voltage. An appropriate value of each of RZ1 and RZ2 needs to be acquired statistically in accordance with a large number of data.

When a low voltage signal is applied to the gate electrode of VT, i.e., Ui is within the standard voltage range, VT may be turned off. At this time, it is able to compensate for the capacitance without through the compensation for the voltage.

The capacitance compensation module will be described hereinafter in conjunction with a specific embodiment.

Figure 5:
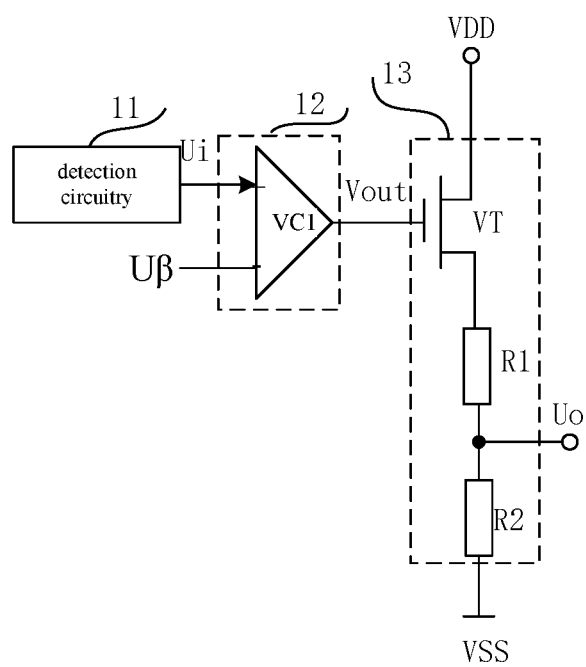
FIG. 5 is still yet another circuit diagram of the capacitance compensation module according to one embodiment of the present disclosure.

As shown in FIG. 5, the capacitance compensation module includes the detection circuitry 11, the determination circuitry 12 and the compensation circuitry 13.

The detection circuitry 11 is configured to detect the initial capacitance of the capacitor formed between each of the plurality of touch electrodes and the ground when the touch electrode is not being touched, treat the initial capacitance through the predetermined algorithm, perform the analog-to-digital conversion on the treated initial capacitance to acquire the raw data, and convert the raw data into the original voltage Ui applied to the touch electrode.

The determination circuitry 12 includes the voltage comparator VC1. The compensation circuitry 13 includes the compensation control signal input end for receiving the compensation control signal Vout. In the embodiment of the present disclosure, the compensation control signal is a voltage signal.

The positive phase input end of the voltage comparator VC1 is connected to the original voltage output end (for outputting the original voltage Ui) of the detection circuitry 11, the negative phase input end thereof is connected to the first voltage threshold input end for inputting the first voltage threshold Uβ, and the output end thereof is connected to the compensation control signal input end (for receiving the compensation control signal Vout).

The compensation circuitry 13 includes: the compensation voltage output end configured to output the compensation voltage Uo; the control switch transistor VT, a gate electrode of which is connected to the compensation control signal input end (for receiving the compensation control signal Vout), and the drain electrode of which is connected to the high power source voltage input end for inputting the high power source voltage VDD; the first divider resistor R1, a first end of which is connected to the source electrode of the control switch transistor VT, and a second end of which is connected to the compensation voltage output end; and the second divider resistor R2, a first end of which is connected to the compensation voltage output end (for outputting the compensation voltage Uo), and a second end of which is connected to the low power source voltage end for inputting the low power source voltage VSS.

For the capacitance compensation module in FIG. 5, the determination circuitry includes the voltage comparator, and the compensation circuitry includes the control switch transistor and the divider-type voltage compensation circuitry. Hence, the determination circuitry and the compensation circuitry may cooperate with each other to achieve the functions of determining an abnormal capacitance point and compensating for the voltage.

During the operation of the capacitance compensation module in FIG. 5, when Ui≤Uβ, Vout is a low voltage signal (corresponding to a digital signal "0"). At this time, VT may be turned off, and Uo may be 0. The raw data corresponding to the touch electrode is within a standard limit specification range.

In addition, when Ui>Uβ, Vout is a high voltage signal. At this time, VT may be turned on, and Uo=Ui*R2/(R1+R2). When Uo<Uβ, a requirement may be met. When the raw data corresponding to a point is beyond the standard limit specification range, this point may be an abnormal point, and the compensation voltage Uo may be equal to (VDD−VSS) *RZ2/(RZ1+RZ2), where RZ1 represents a resistance of the first divider resistor R1, and RZ2 represents a resistance of the second divider resistor R2. An appropriate value of each of RZ1 and RZ2 needs to be acquired statistically in accordance with a large number of data.

Figure 6:
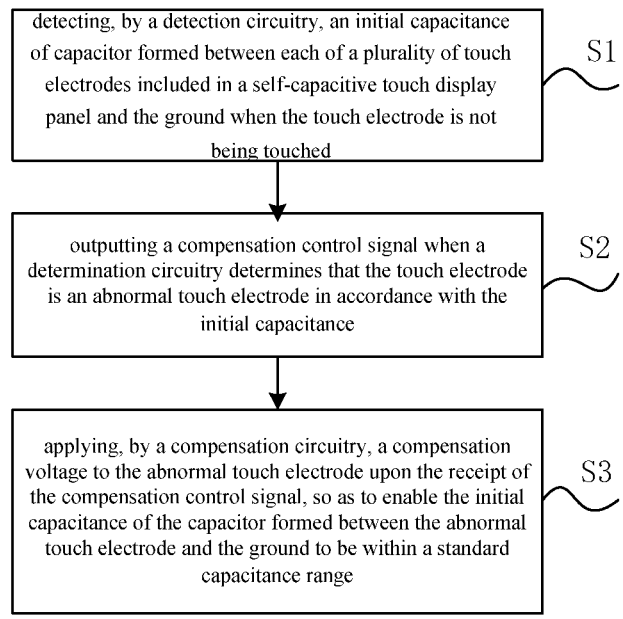
FIG. 6 is a flow chart of a capacitance compensation method according to one embodiment of the present disclosure.

The present disclosure further provides in some embodiments a capacitance compensation method for use in the above-mentioned capacitance compensation module. As shown in FIG. 6, the capacitance compensation method includes: Step S1 of detecting, by the detection circuitry, an initial capacitance of a capacitor formed between each of a plurality of touch electrodes included in a self-capacitive touch display panel and the ground when the touch electrode is not being touched; Step S2 of outputting a compensation control signal when the determination circuitry determines that the touch electrode is an abnormal touch electrode in accordance with the initial capacitance; and Step S3 of applying, by the compensation circuitry, a compensation voltage to the abnormal touch electrode upon the receipt of the compensation control signal, so as to enable the initial capacitance of the capacitor formed between the abnormal touch electrode and the ground to be within a standard capacitance range.

According to the capacitance compensation method in the embodiments of the present disclosure, the detection circuitry detects the initial capacitance. The determination circuitry determines whether the touch electrode is the abnormal touch electrode in accordance with the initial capacitance, and outputs the compensation control signal when the touch electrode is the abnormal touch electrode. Upon the receipt of the compensation control signal, the compensation circuitry applies the compensation voltage to the abnormal touch electrode, so as to enable the initial capacitance of the abnormal touch electrode to be within the standard capacitance range. As a result, it is able to provide a uniform full-screen capacitance, improve the yield of a touch member of the self-capacitive touch display panel, and prevent the occurrence of the capacitance warpage at a periphery of the self-capacitive touch display panel.

To be specific, subsequent to detecting, by the detection circuitry, the initial capacitance of the capacitor formed between each of the plurality of touch electrodes included in the self-capacitive touch display panel and the ground when the touch electrode is not being touched, the capacitance compensation method further includes treating, by the detection circuitry, the initial capacitance through a predetermined algorithm, performing analog-to-digital conversion on the treated initial capacitance so as to acquire raw data, and converting the raw data into an original voltage applied to the touch electrode when the touch electrode is not being touched. The outputting the compensation control signal when the determination circuitry determines that the touch electrode is the abnormal touch electrode in accordance with the initial capacitance includes outputting the compensation control signal when the determination circuitry determines that the original voltage applied to the touch electrode is not within a standard voltage range, and marking the touch electrode as the abnormal touch electrode.

In actual use, the standard voltage range may be smaller than or equal to a first voltage threshold, or the standard voltage range may be smaller than or equal to the first voltage threshold and greater than or equal to a second voltage threshold that is smaller than the first voltage threshold.

The present disclosure further provides in some embodiments a self-capacitive touch display panel including the above-mentioned capacitance compensation module.

The present disclosure further provides in some embodiments a self-capacitive touch display device including the above-mentioned self-capacitive touch display panel.

Figure 7:
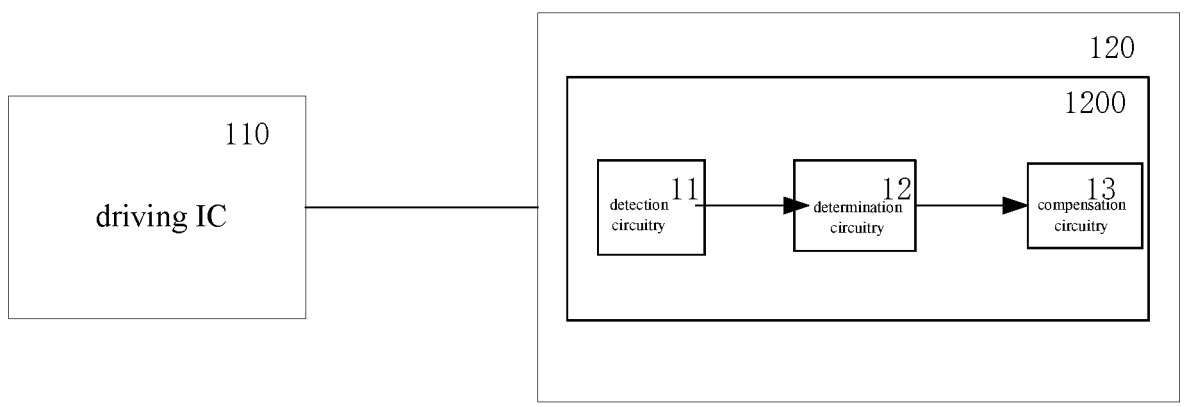
FIG. 7 is a schematic view showing a self-capacitance touch display device according to one embodiment of the present disclosure.

During the implementation, as shown in FIG. 7, the self-capacitive touch display device 100 may further include a driving IC 110.

The compensation circuitry 13 of the capacitance compensation module 1200 included in the self-capacitive touch display panel 120 is configured to, upon the receipt of the compensation control signal, apply a compensation voltage to an abnormal touch electrode via the driving IC 110, so as to enable an initial capacitance of a capacitor formed between the abnormal touch electrode and the ground is within a standard capacitance range.

Unless otherwise defined, such words as "one" or "one of" are merely used to represent the existence of at least one member, rather than to limit the number thereof. For example, such words as "a compound" or "at least one compound" may include a plurality of compounds, e.g., a mixture thereof.

The word "illustrative" merely refers to an example or instance, and any "illustrative" embodiment shall not be necessarily understood as a preferred embodiment, or being advantageous over any other embodiments, and/or excluding a combination of the features from the other embodiments.

The word "possible" refers to the feature involved in a certain embodiment is not provided in the other embodiment. Any specific embodiment of the present disclosure may include a plurality of "possible" features, in the case of no conflict.

Each embodiment in the present disclosure may be described in the form of a certain range. It should be appreciated that, the description in the form of the certain range is merely for convenience and clarification, but shall not be construed as limiting the scope of the present disclosure. Hence, the range shall be deemed as including all possible sub-ranges as well as any single value within the range, regardless of a width of the range. For example, the description "within the range of 1 to 6: shall be deemed as including such sub-ranges as "the range of 1 to 3", "the range of 1 to 4", "the range of 2 to 4", "the range of 2 to 6", "the range of 3 to 6", and any single value within the range, e.g., 1, 2, 3, 4, 5 and 6.

In the case that a specific numerical range is specified, it shall include all numbers (fractional or integral numbers) within the numerical range. Such expressions as "within the range of a first number to a second number" or "ranging from a first number to a second number" are intended to include the first number, the second number and any fractional and integral numbers between the first number and the second number.

It should be further appreciated that, for clarification, some features are separately described in several embodiments, but they may also be combined in a single embodiment. Also, the features described in a single embodiment may also be described separately, or in any appropriate combinations, in the other embodiments. Some features described in a certain embodiment shall not be deemed as necessary features for the embodiment, unless the embodiment is unfeasible without these features.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A capacitance compensation module for use in a self-capacitive touch display panel, the self-capacitive touch display panel comprising a plurality of touch electrodes arranged on a display substrate, the capacitance compensation module comprising:
    a detection circuitry configured to detect an initial capacitance of a capacitor formed between each of the plurality of touch electrodes and a ground when the touch electrode is not being touched;
    a determination circuitry connected to the detection circuitry, and configured to determine whether the touch electrode is an abnormal touch electrode in accordance with the initial capacitance and output a compensation control signal when the touch electrode is the abnormal touch electrode; and
    a compensation circuitry connected to the determination circuitry and configured to, upon the receipt of the compensation control signal, apply a compensation voltage to the abnormal touch electrode, so as to enable the initial capacitance of the capacitor formed between the abnormal touch electrode and the ground to be within a standard capacitance range.

2. The capacitance compensation module according to claim 1, wherein the detection circuitry is further configured to treat the initial capacitance through a predetermined algorithm, perform analog-to-digital conversion on the treated capacitance so as to acquire raw data, and convert the raw data into an original voltage applied to the touch electrode when the touch electrode is not being touched, and the determination circuitry is further configured to output the compensation control signal when the original voltage applied to the touch electrode is not within a standard voltage range, and mark the touch electrode as the abnormal touch electrode.

3. The capacitance compensation module according to claim 2, wherein the standard voltage range is smaller than or equal to a first voltage threshold, or the standard voltage range is smaller than or equal to the first voltage threshold and greater than or equal to a second voltage threshold that is smaller than the first voltage threshold.

4. The capacitance compensation module according to claim 3, wherein when the standard voltage range is smaller than or equal to the first voltage threshold, the compensation circuitry comprises a compensation control signal input end configured to receive the compensation control signal;
    the detection circuitry comprises an original voltage output end configured to output the original voltage; and
    the determination circuitry comprises a voltage comparator, a positive phase input end of which is connected to the original voltage output end of the detection circuitry, a negative phase input end of which is connected to a first voltage threshold input end, and an output end of which is connected to the compensation control signal input end.

5. The capacitance compensation module according to claim 4, wherein the compensation circuitry further comprises:
    a compensation voltage output end configured to output the compensation voltage;
    a control switch transistor, a gate electrode of which is connected to the compensation control signal input end, and a first electrode of which is connected to a high power source voltage input end;
    a first divider resistor unit, a first end of which is connected to a second electrode of the control switch transistor, and a second end of which is connected to the compensation voltage output end; and
    a second divider resistor unit, a first end of which is connected to the compensation voltage output end, and a second end of which is connected to a low power source voltage input end.

6. The capacitance compensation module according to claim 5, wherein the control switch transistor is an N-type transistor.

7. The capacitance compensation module according to claim 5, wherein the control switch transistor is a P-type transistor.

8. The capacitance compensation module according to claim 3, wherein when the standard voltage range is smaller than or equal to the first voltage threshold and greater than or equal to the second voltage threshold that is smaller than the first voltage threshold, the compensation circuitry comprises a compensation control signal input end configured to receive the compensation control signal;
    the detection circuitry comprises an original voltage output end configured to output the original voltage;
    the determination circuitry comprises a first voltage comparator, a second voltage comparator, and an OR gate;
    a positive phase input end of the first voltage comparator is connected to the original voltage output end of the detection circuitry, a negative phase input end of the first voltage comparator is connected to a first voltage threshold input end, and an output end of the first voltage comparator is connected to a first input end of the OR gate;
    a positive phase input end of the second voltage comparator is connected to a second voltage threshold input end, a negative phase input end of the second voltage comparator is connected to the original voltage output end of the detection circuitry, and an output end of the second voltage comparator is connected to a second input end of the OR gate; and
an output end of the OR gate is connected to the compensation control signal input end.

9. A capacitance compensation method for use in the capacitance compensation module according to claim 1, comprising:
detecting, by the detection circuitry, an initial capacitance of a capacitor formed between each of a plurality of touch electrodes included in a self-capacitive touch display panel and the ground when the touch electrode is not being touched;
outputting a compensation control signal when the determination circuitry determines that the touch electrode is an abnormal touch electrode in accordance with the initial capacitance; and
applying, by the compensation circuitry, a compensation voltage to the abnormal touch electrode upon the receipt of the compensation control signal, so as to enable the initial capacitance of the capacitor formed between the abnormal touch electrode and the ground to be within a standard capacitance range.

10. The capacitance compensation method according to claim 9, wherein subsequent to detecting, by the detection circuitry, the initial capacitance of the capacitor formed between each of the plurality of touch electrodes included in the self-capacitive touch display panel and the ground when the touch electrode is not being touched, the capacitance compensation method further comprises treating, by the detection circuitry, the initial capacitance through a predetermined algorithm, performing analog-to-digital conversion on the treated initial capacitance so as to acquire raw data, and converting the raw data into an original voltage applied to the touch electrode when the touch electrode is not being touched, wherein the outputting the compensation control signal when the determination circuitry determines that the touch electrode is the abnormal touch electrode in accordance with the initial capacitance includes outputting the compensation control signal when the determination circuitry determines that the original voltage applied to the touch electrode is not within a standard voltage range, and marking the touch electrode as the abnormal touch electrode.

11. The capacitance compensation method according to claim 10, wherein the standard voltage range is smaller than or equal to a first voltage threshold, or the standard voltage range is smaller than or equal to the first voltage threshold and greater than or equal to a second voltage threshold that is smaller than the first voltage threshold.

12. A self-capacitive touch display panel, comprising a capacitance compensation module,
wherein the capacitance compensation module is configured for use in a self-capacitive touch display panel, the self-capacitive touch display panel comprising a plurality of touch electrodes arranged on a display substrate, the capacitance compensation module comprising:
a detection circuitry configured to detect an initial capacitance of a capacitor formed between each of the plurality of touch electrodes and a ground when the touch electrode is not being touched;
a determination circuitry connected to the detection circuitry, and configured to determine whether the touch electrode is an abnormal touch electrode in accordance with the initial capacitance and output a compensation control signal when the touch electrode is the abnormal touch electrode; and
a compensation circuitry connected to the determination circuitry and configured to, upon the receipt of the compensation control signal, apply a compensation voltage to the abnormal touch electrode, so as to enable the initial capacitance of the capacitor formed between the abnormal touch electrode and the ground to be within a standard capacitance range.

13. A self-capacitive touch display device, comprising the self-capacitive touch display panel according to claim 12.

14. The self-capacitive touch display device according to claim 13, further comprising a driving integrated circuit (IC), wherein the compensation circuitry of the capacitance compensation module included in the self-capacitive touch display panel is configured to, upon the receipt of the compensation control signal, apply a compensation voltage to an abnormal touch electrode via the driving IC, so as to enable an initial capacitance of a capacitor formed between the abnormal touch electrode and the ground is within a standard capacitance range.

15. The self-capacitive touch display panel according to claim 12, wherein the detection circuitry is further configured to treat the initial capacitance through a predetermined algorithm, perform analog-to-digital conversion on the treated capacitance so as to acquire raw data, and convert the raw data into an original voltage applied to the touch electrode when the touch electrode is not being touched, and the determination circuitry is further configured to output the compensation control signal when the original voltage applied to the touch electrode is not within a standard voltage range, and mark the touch electrode as the abnormal touch electrode.

16. The self-capacitive touch display panel according to claim 15, wherein the standard voltage range is smaller than or equal to a first voltage threshold, or the standard voltage range is smaller than or equal to the first voltage threshold and greater than or equal to a second voltage threshold that is smaller than the first voltage threshold.

17. The capacitance compensation module according to claim 16, wherein when the standard voltage range is smaller than or equal to the first voltage threshold, the compensation circuitry comprises a compensation control signal input end configured to receive the compensation control signal;
the detection circuitry comprises an original voltage output end configured to output the original voltage; and
the determination circuitry comprises a voltage comparator, a positive phase input end of which is connected to the original voltage output end of the detection circuitry, a negative phase input end of which is connected to a first voltage threshold input end, and an output end of which is connected to the compensation control signal input end.

18. The self-capacitive touch display panel according to claim 17, wherein the compensation circuitry further comprises:
a compensation voltage output end configured to output the compensation voltage;
a control switch transistor, a gate electrode of which is connected to the compensation control signal input end, and a first electrode of which is connected to a high power source voltage input end;
a first divider resistor unit, a first end of which is connected to a second electrode of the control switch transistor, and a second end of which is connected to the compensation voltage output end; and a second divider resistor unit, a first end of which is connected to the compensation voltage output end, and a second end of which is connected to a low power source voltage input end.

19. The self-capacitive touch display panel according to claim 16, wherein when the standard voltage range is smaller than or equal to the first voltage threshold and greater than or equal to the second voltage threshold that is smaller than the first voltage threshold, the compensation circuitry comprises a compensation control signal input end configured to receive the compensation control signal;

the detection circuitry comprises an original voltage output end configured to output the original voltage;

the determination circuitry comprises a first voltage comparator, a second voltage comparator, and an OR gate;

a positive phase input end of the first voltage comparator is connected to the original voltage output end of the detection circuitry, a negative phase input end of the first voltage comparator is connected to a first voltage threshold input end, and an output end of the first voltage comparator is connected to a first input end of the OR gate;

a positive phase input end of the second voltage comparator is connected to a second voltage threshold input end, a negative phase input end of the second voltage comparator is connected to the original voltage output end of the detection circuitry, and an output end of the second voltage comparator is connected to a second input end of the OR gate; and an output end of the OR gate is connected to the compensation control signal input end.

20. The self-capacitive touch display panel according to claim 12, wherein the self-capacitive touch display panel is a Full In Cell (FIC) touch display panel.

* * * * *